US008893154B2

(12) United States Patent
Lin

(10) Patent No.: US 8,893,154 B2
(45) Date of Patent: Nov. 18, 2014

(54) MOBILE DEVICE WITH TWO OPERATING SYSTEMS AND METHOD FOR SHARING HARDWARE DEVICE BETWEEN TWO OPERATING SYSTEMS THEREOF

(75) Inventor: Chien-Liang Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1571 days.

(21) Appl. No.: 12/204,780

(22) Filed: Sep. 4, 2008

(65) Prior Publication Data

US 2009/0064186 A1 Mar. 5, 2009

Related U.S. Application Data

(60) Provisional application No. 60/970,244, filed on Sep. 5, 2007.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ...................................... *G06F 9/54* (2013.01)
USPC ....................................................... 719/315

(58) Field of Classification Search
USPC ......................................................... 719/315
See application file for complete search history.

(56) References Cited

U.S. PATENT DOCUMENTS

| 6,289,391 | B1 | 9/2001 | Smith et al. | |
|---|---|---|---|---|
| 6,496,847 | B1 * | 12/2002 | Bugnion et al. | 718/1 |
| 6,976,180 | B2 | 12/2005 | Cupps et al. | |
| 7,020,488 | B1 * | 3/2006 | Bleile et al. | 455/557 |

(Continued)

FOREIGN PATENT DOCUMENTS

| CN | 101022521 | 8/2007 |
|---|---|---|
| EP | 1526455 | 4/2005 |

(Continued)

OTHER PUBLICATIONS

"Search Report of European counterpart application of co-pending Application", issued on Mar. 23, 2009, p. 1-p. 6, Application # EP 08 01 57 16.

(Continued)

*Primary Examiner* — Andy Ho
*Assistant Examiner* — Timothy A Mudrick
(74) *Attorney, Agent, or Firm* — Jianq Chyun IP Office

(57) ABSTRACT

A mobile device and a method for sharing a hardware device thereof are provided. Two operation systems are executed on the present mobile device simultaneously, and an embedded controller is configured to communicate among the two operation systems and a shared hardware device of the mobile device. When one of the operation systems encodes an operating command into a uniform message and transmits the uniform message to the embedded controller, the uniform message is decoded into the operating command by the embedded controller such that the hardware device operates according to the decoded operating command. On the other hand, when the embedded controller receives input data from the hardware device, the embedded controller encodes the input data into the uniform message and transmits the uniform message to one of the operation systems. The operation system receiving the uniform message decodes the uniform message into the input data.

28 Claims, 8 Drawing Sheets

(56) References Cited

U.S. PATENT DOCUMENTS

| | | | |
|---|---|---|---|
| 7,127,723 | B2 | 10/2006 | Endo et al. |
| 7,158,972 | B2 | 1/2007 | Marsland |
| 7,184,003 | B2 | 2/2007 | Cupps et al. |
| 2001/0029550 | A1 | 10/2001 | Endo et al. |
| 2002/0059080 | A1 | 5/2002 | Kasirer et al. |
| 2003/0220141 | A1* | 11/2003 | Corrigan et al. ............... 463/36 |
| 2003/0226044 | A1* | 12/2003 | Cupps et al. ................ 713/300 |
| 2005/0071768 | A1 | 3/2005 | Araki et al. |
| 2005/0091436 | A1* | 4/2005 | Huang ........................ 710/313 |
| 2005/0182922 | A1 | 8/2005 | Guo et al. |
| 2005/0266881 | A1 | 12/2005 | Keppler et al. |
| 2006/0010314 | A1 | 1/2006 | Xu |
| 2006/0123432 | A1 | 6/2006 | Bendapudi et al. |
| 2006/0161985 | A1 | 7/2006 | Zhao |
| 2006/0235898 | A1 | 10/2006 | Loveland |
| 2006/0236376 | A1 | 10/2006 | Liu et al. |
| 2007/0005946 | A1 | 1/2007 | Zimmer et al. |
| 2007/0022258 | A1 | 1/2007 | Panabaker et al. |
| 2007/0038875 | A1 | 2/2007 | Cupps et al. |
| 2007/0043961 | A1 | 2/2007 | Cupps et al. |
| 2007/0140199 | A1* | 6/2007 | Zhao et al. .................... 370/338 |
| 2008/0177905 | A1* | 7/2008 | Ohta et al. ...................... 710/14 |
| 2008/0222076 | A1 | 9/2008 | Dandekar et al. |
| 2009/0059965 | A1 | 3/2009 | Lin et al. |
| 2009/0061838 | A1 | 3/2009 | Lin |

FOREIGN PATENT DOCUMENTS

| | | |
|---|---|---|
| EP | 1796011 | 6/2007 |
| TW | 200523752 | 7/2005 |
| WO | 2005055117 | 6/2005 |
| WO | 2006088809 | 8/2006 |

OTHER PUBLICATIONS

"Search Report of European counterpart application", issued on Jan. 29, 2009, p. 1-p. 8, Application # EP 08 01 54 84.

Jay Munro, "Virtual Machines & VNware, Part II", http://www.extremetech.com/article2/0.2845.10402.00asp, retrieved on Dec. 28, 2001.

"Non-Final Office Action of America Co-pending Application (U.S. Appl. No. 12/204,776)", issued on Jan. 11, 2012, p. 1-p. 9, in which the listed references were cited.

"Non-Final Office Action of America Co-pending Application (U.S. Appl. No. 12/204,772)", issued on Mar. 18, 2010, p. 1-p. 10, in which the listed references were cited.

"Final Office Action of America Co-pending Application (U.S. Appl. No. 12/204,772)", issued on Aug. 27, 2010, p. 1- p. 10.

"Non-Final Office Action of America Co-pending Application (U.S. Appl. No. 12/204,772)", issued on Jan. 3, 2011, p. 1-p. 13, in which the listed references were cited.

"Final Office Action of America Co-pending Application (U.S. Appl. No. 12/204,772)", issued on Jun. 10, 2011, p. 1-p. 13.

"Non-Final Office Action of America Co-pending Application (U.S. Appl. No. 12/204,772)", issued on Sep. 29, 2011, p. 1-p. 13, in which the listed references were cited.

"Non-Final Office Action of America Co-pending Application (U.S. Appl. No. 12/204,772)", issued on Feb. 3, 2012, p. 1-p. 14, in which the listed references were cited.

"Notice of Allowance of U.S. counterpart application" (U.S. Appl. No. 12/204,776) issued on Apr. 20, 2012, p. 1-p. 6.

* cited by examiner

MOBILE DEVICE WITH TWO OPERATING SYSTEMS AND METHOD FOR SHARING HARDWARE DEVICE BETWEEN TWO OPERATING SYSTEMS THEREOF

CROSS-REFERENCE TO RELATED APPLICATIONS

This application claims the priority benefit of U.S. provisional application Ser. No. 60/970,244, filed on Sep. 5, 2007 by the same applicant. There are two co-pending US patent applications filed on the same date by the same applicant, wherein the first US co-pending application serial number 2009/0059965 entitled "METHOD AND SYSTEM FOR SUPPORTING NETWORK SHARING AND DATA SYNCHRONIZATION SIMULTANEOUSLY" and the second US co-pending application serial number 2009/0061838 entitled "MOBILE DEVICE WITH MULTIPLE OPERATING SYSTEMS AND METHOD FOR SHARING A WIRELESS COMMUNICATION MODULE BETWEEN OPERATING SYSTEMS THEREOF" also claim the priority benefit of the aforementioned US provisional application. All disclosure of the US provisional application and the co-pending US patent applications are incorporated herein by reference.

BACKGROUND OF THE INVENTION

1. Field of the Invention

The present invention relates to a mobile device supporting multiple operating systems. More particularly, the present invention relates to a mobile device providing a hardware device shared between two operating systems and a sharing method thereof.

2. Description of Related Art

Common mobile devices are generally divided into notebook personal computers and personal digital assistants (PDA). The notebook personal computers adopting x86 architecture and non-embedded operating systems have stronger computation ability and higher power consumption. The PDAs adopting embedded architecture and embedded operating systems have lower computation ability and less power consumption. Therefore, it has become a mainstream product design to integrate a notebook computer and a PDA into one mobile device, so as to combine the advantages of the two to improve the overall performance.

In the above mobile device, two central processing units (CPU) are installed for running two operating systems at the same time. One of the CPUs is used to run the non-embedded operating system (e.g. Microsoft Windows Vista®), and the other CPU is used to run the embedded operating system (e.g. Microsoft Windows Mobile®). The two operating systems can be run at the same time. Thus, a user can perform simple works, for example, schedule arrangement, contactor management, E-mail handling, and so on under the embedded operating system, so as to reduce power consumption. The user can also switch the mobile device to run the non-embedded operating system so as to perform word processing, audio-visual editing, and other resource-consuming works.

However, how to share peripheral devices, e.g. keyboard, touchpad and liquid crystal display (LCD), between two operating systems in a mobile device is still an important issue. Generally speaking, a logic design for efficiently controlling and managing the peripheral devices between the two operating systems is needed for the mobile device. Otherwise, the mobile device would need two sets of independent peripheral devices to satisfy the requirements of the two operating systems, which would increase the cost, size, weight, and energy consumption of the mobile device, contrary to the modern trend of smaller size, lower weight, and energy conservation.

SUMMARY OF THE INVENTION

Accordingly, the disclosure is directed to a mobile device which can provide one peripheral hardware device to be shared between at least two operating systems.

The disclosure is directed to a method for sharing a hardware device, in which a uniform message with a common format is transmitted to achieve the purpose of sharing one peripheral hardware devices between at least two operating systems.

The disclosure is directed to a mobile device comprising a first processor, a second processor, a hardware device and an embedded controller. The first processor is configured to execute a first operating system (OS). The second processor is configured to execute a second OS. The embedded controller is coupled to the first processor, the second processor, and the hardware device, and configured to communicate between the first OS and the hardware device and between the second OS and the hardware device through a uniform message. When the first OS encodes a first operating command into the uniform message and sends the uniform message to the embedded controller, the embedded controller decodes the uniform message to the first operating command such that the hardware device operates according to the first operating command. On the other hand, when the second OS encodes a second operating command into the uniform message and sends the uniform message to the embedded controller, the embedded controller decodes the uniform message to the second operating command such that the hardware device operates according to the second operating command. When the embedded controller receives the input data from the hardware device, the embedded controller encodes the input data into the uniform message and sends the uniform message to one of the first OS and the second OS, and the OS receiving the uniform message decodes the uniform message to the input data.

The disclosure is directed to a mobile device, comprising a first processor, a second processor, a hardware device and an embedded controller. The first processor is configured to execute a first OS, the second processor is configured to execute a second OS, and the hardware device is configured to generate an input data. The embedded controller has a first communication port, a second communication port, and a connection port, wherein the connection port is electrically coupled to the hardware device for receiving the input data. The embedded controller selectively sends the received input data to the first OS via the first communication port or to the second OS via the second communication port.

The disclosure is directed to a mobile device, comprising a first processor, a second processor, a hardware device and an embedded controller. The first processor is configured to execute a first OS which provides a first operating command. The second processor is configured to execute a second OS which provides a second operating command. The embedded controller has a first communication port for receiving the first operating command from the first OS, a second communication port for receiving the second operating command from the second OS, and a connection port electrically coupled to the hardware device. The embedded controller is configured to selectively receive the first operating command via the first communication port or receive the second operating command via the second communication port, and output the received operating command to the hardware device via the connection port such that the hardware device operates according to the outputted operating command.

The disclosure is directed to a mobile device comprising a first processor, a second processor, and an embedded controller. The first processor is configured to execute a first OS, and the second processor is configured to execute a second OS. The embedded controller is electrically coupled to the first processor and the second processor and provides a first communication interface for transmitting a first data between the first OS and the second OS. The mobile device further comprises a second communication interface constructed between the first OS and the second OS for transmitting a second data. In one embodiment of the disclosure, the size of the second data is greater than the size of the first data, and both of the first communication port and the second communication port are serial communication ports.

The disclosure is directed to a method for sharing a hardware device in a mobile device having a hardware device, wherein a first OS and a second OS are executed on the mobile device. In this method, an input data from the hardware device is received first. Then, the input data is encoded into a uniform message and transmitted to one of the first OS and the second OS. Finally, the uniform message is decoded to the input data when the uniform message is received by one of the first OS and the second OS.

The disclosure is directed to a method for sharing a hardware device in a mobile device having a hardware device and an embedded controller, wherein the mobile device can execute a first OS and a second OS. First, an operating command is encoded into a uniform message by one of the first OS and the second OS, and then the uniform message is transmitted to the embedded controller. The uniform message is decoded to the operating command by the embedded controller, and the operating command is transmitted to the hardware device such that the hardware device operates according to the operating command.

In the disclosure, an embedded controller is configured to coordinate operating systems executed on the mobile device and the peripheral hardware device. Each operating system has a specific driver and a hardware controller functioning as an encoder/decoder for encoding or decoding the command and data so as to achieve the purpose of communicating between the operating system and the hardware device. As a result, one hardware device can be shared by multiple operating systems, so as to save the hardware cost and reduce the size, weight, and electric energy of the mobile device.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1A:
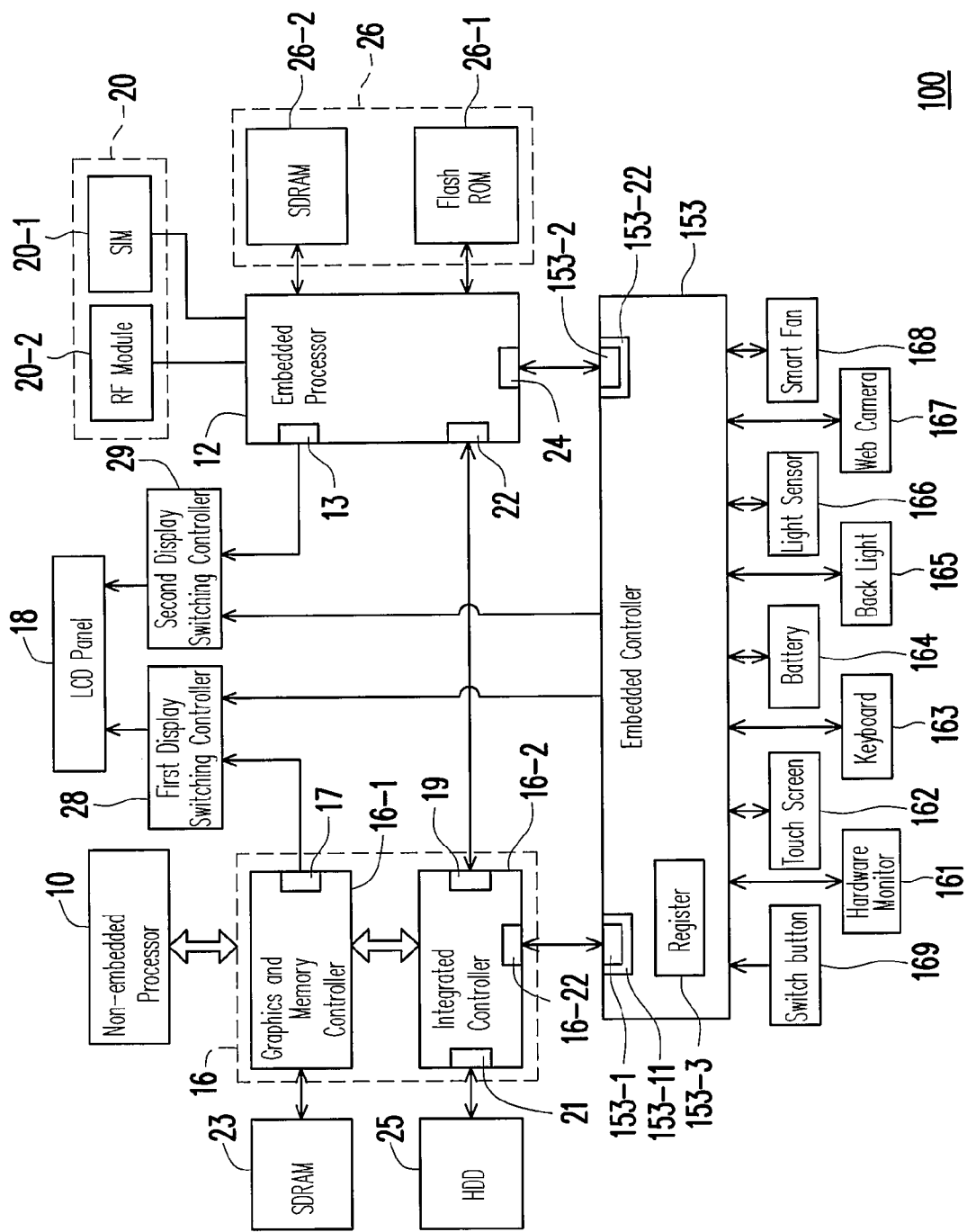
FIG. 1A is a block diagram of the hardware architecture of a mobile device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a block diagram of the hardware architecture of a mobile device 100 according to an embodiment of the present invention. Referring to FIG. 1A, the mobile device 100 includes a non-embedded processor 10, an embedded processor 12, an embedded controller (EC) 153, a control unit 16 and a liquid crystal display (LCD) panel 18. The mobile device 100 may be any kind of portable electronic device, e.g. Notebook PC, ultra mobile PC (UMPC) and personal digital assistance (PDA), running at least two operating systems.

The non-embedded processor 10 can perform complicated tasks or programs running under a non-embedded operating system, e.g. WINDOWS VISTA® commercially available from Microsoft Corporation. The embedded processor 12 performs simple tasks or programs, which are simpler than those performed by the non-embedded processor 10 and run under an embedded operating system, e.g. WINDOWS MOBILE 6® commercially available from Microsoft Corporation. The embedded controller 153 provides a first communication port 153-1 electrically connected to a communication port 16-22 of an integrated controller 16-2, and a second communication port 153-2 electrically connected to the embedded processor 12 such that the embedded controller 153 is electrically coupled between the non-embedded processor 10 and the embedded processor 12. Accordingly, the non-embedded processor 10 may electrically communicate with the embedded processor 12 through the embedded controller 153.

In this embodiment, the communication port 16-22 may be a low pin count (LPC) port; in addition, the first communication port 153-1 may be a low pin count (LPC) port provided by a built-in LPC device 153-11 and the second communication port 153-2 may be a universal asynchronous receiver/transmitter (UART) port provided by a built-in UART device 153-22. However, in other embodiment of the present invention, the first communication port 153-1 and the second communication port 153-2 may be any kind of serial or parallel port such as Universal Series Bus (USB) port, Industry Standard Architecture (ISA) port and Inter Integrated Circuit ($I^2C$) port, and the LPC device 153-11 and the UART device 153-22 may be independent devices and separated from and electrically connected to the embedded controller 153.

The embedded controller 153 is electrically connected to peripheral hardware devices such as a hardware monitor 161, a touch screen 162, a keyboard 163, a battery 164, a back light 165 for illuminating the LCD panel 18, a light sensor 166, a web camera 167, a smart fan 168, and a switch button 169.

The controlling unit 16 includes a graphics and memory controller 16-1 and an integrated controller 16-2 electrically connected to the graphics and memory controller 16-1. The graphics and memory controller 16-1 is electrically coupled to the non-embedded processor 10 and the LCD panel 18 and has a built-in display controller 17 for outputting a display signal to the LCD panel 18. In addition, the graphics and memory controller 16-1 is also electrically connected to a synchronous dynamic random access memory (SDRAM) 23.

The non-embedded processor 10 may access the SDRAM 23 through the graphics and memory controller 16-1. The SDRAM 23 may serve as the main memory for the non-embedded processor 10 to perform programs running under the non-embedded operating system, e.g. WINDOWS VISTA®. The integrated controller 16-2 provides an integrated drive electronics (IDE) interface 18 for electrically connecting with a hard disc drive (HDD) 25, and an USB port 19 electrically connected to an USB port 22 of the embedded processor 12.

The embedded processor 12 has the USB port 22 electrically connected to the USB port 19 of the integrated controller 16-2 and an UART port 24 electrically connected to the UART port 153-2 of the embedded controller 153. The embedded processor 12 also has a built-in display controller 13 for outputting a display signal to the LCD panel 18.

In addition, the embedded processor 12 is electrically connected to a storage device 26 and a network connection module 20. The storage device 26 includes a flash read only memory (ROM) 26-1 and a SDRAM 26-2. The flash ROM 26-1 may store the embedded operating system, e.g. WINDOWS MOBILE 6®, and applications performed by the embedded processor 12. The SDRAM 26-2 may serve as the main memory for the embedded processor 12 to perform programs running under the embedded operating system. The network connection module 20 includes a signature identification module (SIM) 20-1 and a radio frequency (RF) module 20-2.

The mobile device 100 also includes a first display switching controller 28 electrically coupled between the control unit 16 and the LCD panel 18, and a second switching controller 29 electrically coupled between the embedded processor 12 and the LCD panel 18. The embedded controller 153 is electrically connected to the first and second display switching controllers 28 and 29 and can decide which display signal the LCD panel 18 will receive, i.e. that from the graphics and memory controller 16-1 or from the embedded processor 12, according to a switching signal generated by a press of the button switch 169.

Figure 1B:
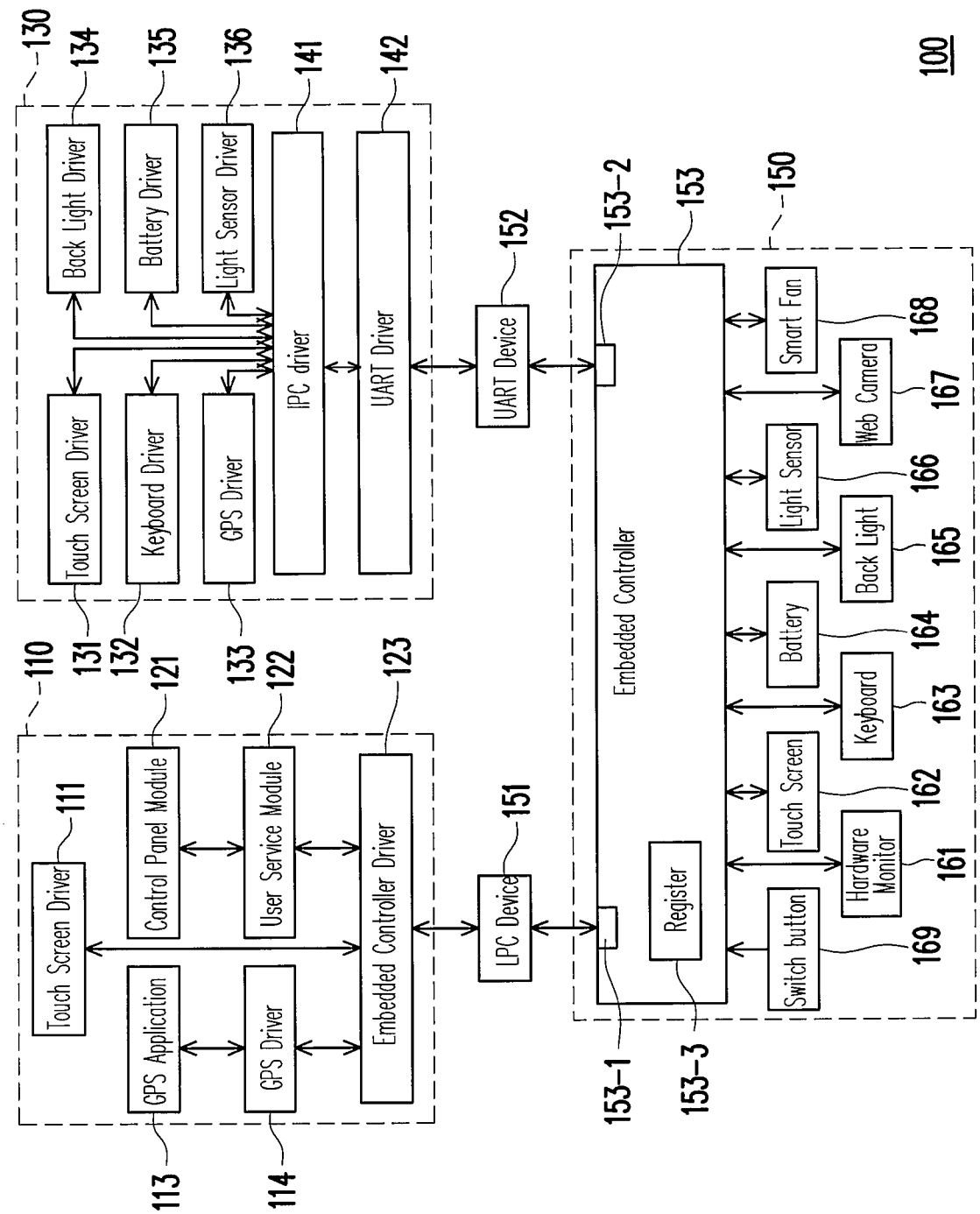
FIG. 1B is a block diagram of the software architecture of a mobile device according to an embodiment of the present invention.

FIG. 1B is a block diagram of the software architecture of a mobile device according to an embodiment of the present invention. In FIG. 1B, same reference numerals are used to indicate the same elements or components shown in FIG. 1A. The first OS 110 is a non-embedded OS including a touch screen driver 111, a GPS application 113, a GPS driver 114, a control panel module 121, a user service module 122, and an embedded controller (EC) driver 123. The second OS 130 is an embedded OS including six drivers 131-136, an inter-process communication (IPC) driver 141, and a universal asynchronous receiver/transmitter (UART) driver 142.

The common hardware module 150 includes an embedded controller 153 and peripheral hardware devices 161-168 electrically connected to the embedded controller 153. The embedded controller 153 has an LPC port 153-1 and an UART port 153-2. A low pin count (LPC) device 151 is electrically connected to the LPC port 153-1 such that the first OS 110 can communicate with the peripheral hardware devices 161-168 through the LPC port 153-1. An UART device 152 is electrically connected to the UART port 153-2 such that the second OS 130 can communicate with the peripheral hardware devices 161-168 through the UART port 153-2. In this embodiment, the LPC device 151 may be built in the integrated controller 16-2 for providing the LPC port 16-22 shown in FIG. 1A, and the UART device 152 may be built in the embedded processor 12 for providing the UART port 24 shown in FIG. 1A.

The mobile device 100 includes a switch button 169 electrically coupled to the EC 153. Whenever the switch button 169 is pressed, a value stored in a register 153-3 inside the EC 153 will change between "1" and "0". When the value is changed from "0" to "1", the ownership of the common hardware module 150 will be switched from the embedded OS 130 to the non-embedded OS 110. When the value is changed from "1" to "0", the ownership of the common hardware module 150 will be switched from the non-embedded OS 110 to the embedded OS 130. Therefore, whenever the switch button 169 is pressed, the EC 153 switches the ownership of the common hardware module 150 between the two operating systems 110 and 130 according to the change of the value stored in the register 153-3. When the non-embedded OS 110 owns the common hardware module 150, the non-embedded OS 110 receives input events from the peripheral hardware devices, e.g. key strokes on the keyboard 163 and object touches on the touch screen 162. When the embedded OS 130 owns the common hardware module 150, the embedded OS 130 receives input events from the peripheral hardware devices 161-168.

In addition, when the value stored in the register 153-3 is changed from "0" to "1", the EC 153 will send two switching signals to respectively turn on the first display switching controller 28 and turn off the second display switching controller 29 such that the display signal outputted from the graphics and memory controller 16-1 can be transmitted to the LCD panel 18 through the first display switching controller 28. When the value stored in the register 153-3 is changed from "1" to "0", the EC 153 will send the two switching signals to respectively turn off the first display switching controller 28 and turn on the second display switching controller 29 such that the display signal outputted from the embedded processor 12 can be transmitted to the LCD panel 18 through the second display switching controller 29. Accordingly, when the ownership of the common hardware module 150 is switched from the embedded OS 130 to the non-embedded OS 110 upon pressing the switch button 169, the display image showing UI of the embedded OS 130 is switched to that showing UI of the non-embedded OS 110 on the LCD panel 18. On the other hand, when the ownership of the common hardware module 150 is switched from the non-embedded OS 110 to the embedded OS 130 upon pressing the switch button 169, the display image showing UI of the non-embedded OS 110 is switched to that showing UI of the embedded OS 130 on the LCD panel 18.

The EC 153 can identify which OS is the owner at all times according to the value stored in the register 153-3. Therefore, the EC 153 can redirect I/O commands and data between the peripheral hardware devices 161-168 and the owner OS. In another embodiment of the present invention, the value stored in the register 153-3 may also be changed between "0" and "1" by touching a virtual icon shown in the LCD panel 18 through the touch screen 162.

Figure 2:
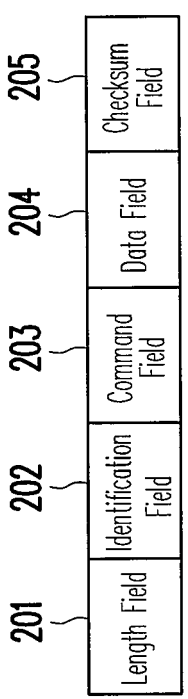
FIG. 2 is a schematic view of a uniform message format according to an embodiment of the present invention.

In order to unify the interfaces between the peripheral hardware devices 161-168 and the various drivers of the two operating systems 110 and 130, a uniform message is used to carry I/O commands and data. FIG. 2 is a schematic view of a uniform message format according to an embodiment of the present invention. The uniform message has a common format for the three-party communication among the common hardware module 150 and the two operating systems 110 and 130. The EC driver 123, the IPC driver 141, and the EC 153 serve as the encoder/decoder for the uniform message in the three parties respectively.

A uniform message includes four mandatory fields, namely a length field 201, an identification field 202, a command field 203, and a checksum field 205. In addition, the uniform message further includes an optional data field 204. The length field 201 records the byte length of the uniform message. The identification field 202 records the source and the destination of the uniform message. The source may be one of the common hardware module 150 and the two operating systems 110 and 130. The destination may be the other one of the three parties. The command field 203 records the instruction format. The data field 204 records the data given by the software module or the hardware device. The checksum field 205 is the checksum of the entire uniform message for ensuring the integrity of the uniform message.

The control panel module 121 is a program with a user interface (UI) for managing and monitoring the peripheral hardware devices 161-168. For example, a user may adjust the brightness of the back light 165 or control the rotating speed of the smart fan 168 through the control panel module 121. The user service module 122 is a resident program without UI which serves as an interface between the control panel module 121 and the EC driver 123.

The EC driver 123 is the encoder/decoder of the uniform message in the non-embedded OS 110. When the EC driver 123 receives a command or a request from a driver or the user service module 122 in the non-embedded OS 110, the EC driver 123 packs the command or request into a uniform message and then forwards it to the EC 153. When the EC driver 123 receives a uniform message from the EC 153, the EC driver 123 decodes the uniform message to the command or data and then forwards the command or data to a recipient, e.g. the touch screen driver 111, in the non-embedded OS 110.

The EC 153 communicates with the non-embedded OS 110 through an LPC interface. In other embodiment of the present invention, the LPC interface may be replaced by other interfaces such as USB interface, ISA interface and I²C interface. The LPC device 151 handles the communication between the EC driver 123 and the EC 153. The EC 153 is the nexus of the three-party communication among the common hardware module 150 and the two operating systems 110 and 130. As shown in the following exemplary communication flows, the EC 153 may encode command or data into a uniform message, decode command or data from a uniform message, accept the command or data inside a uniform message, reply a uniform message, forward a uniform message to the non-embedded OS 110 or the embedded OS 130, or transmits a uniform message by itself to one of the non-embedded OS 110 and the embedded OS 130.

Furthermore, the EC 153 can serves as an encoder/decoder of the uniform message for the common hardware module 150. The EC 153 is able to detect whether or not receiving a hardware data from one of the peripheral hardware devices 161-168, or receiving a uniform message from one of the operating systems 110 and 130. When the EC 153 receives the hardware data from one of the peripheral hardware devices 161-168, the hardware data is encoded into the uniform message; afterwards, the uniform message is sent to the non-embedded OS 110 or the embedded OS 130 and then decoded to the hardware data. On the other hand, when the EC 153 receives the uniform message sent by the non-embedded OS 110 or the embedded OS 130, the uniform message is decoded to the operating command, and the operating command is transmitted to the peripheral hardware devices 161-168 such that the peripheral hardware devices 161-168 can operate according to the operating command.

In addition, The EC 153 communicates with the embedded OS 130 through an UART interface. In other embodiment of the present invention, the UART interface may be replaced by other interfaces such as USB interface, ISA interface and I²C interface. The UART device 152 and the UART driver 142 handle the communication between the IPC driver 141 and the EC 153. The IPC driver 141 serves as an encoder/decoder for the uniform message in the embedded OS 130 and the function of the IPC driver 141 is similar to that of the EC driver 123.

Figure 3:
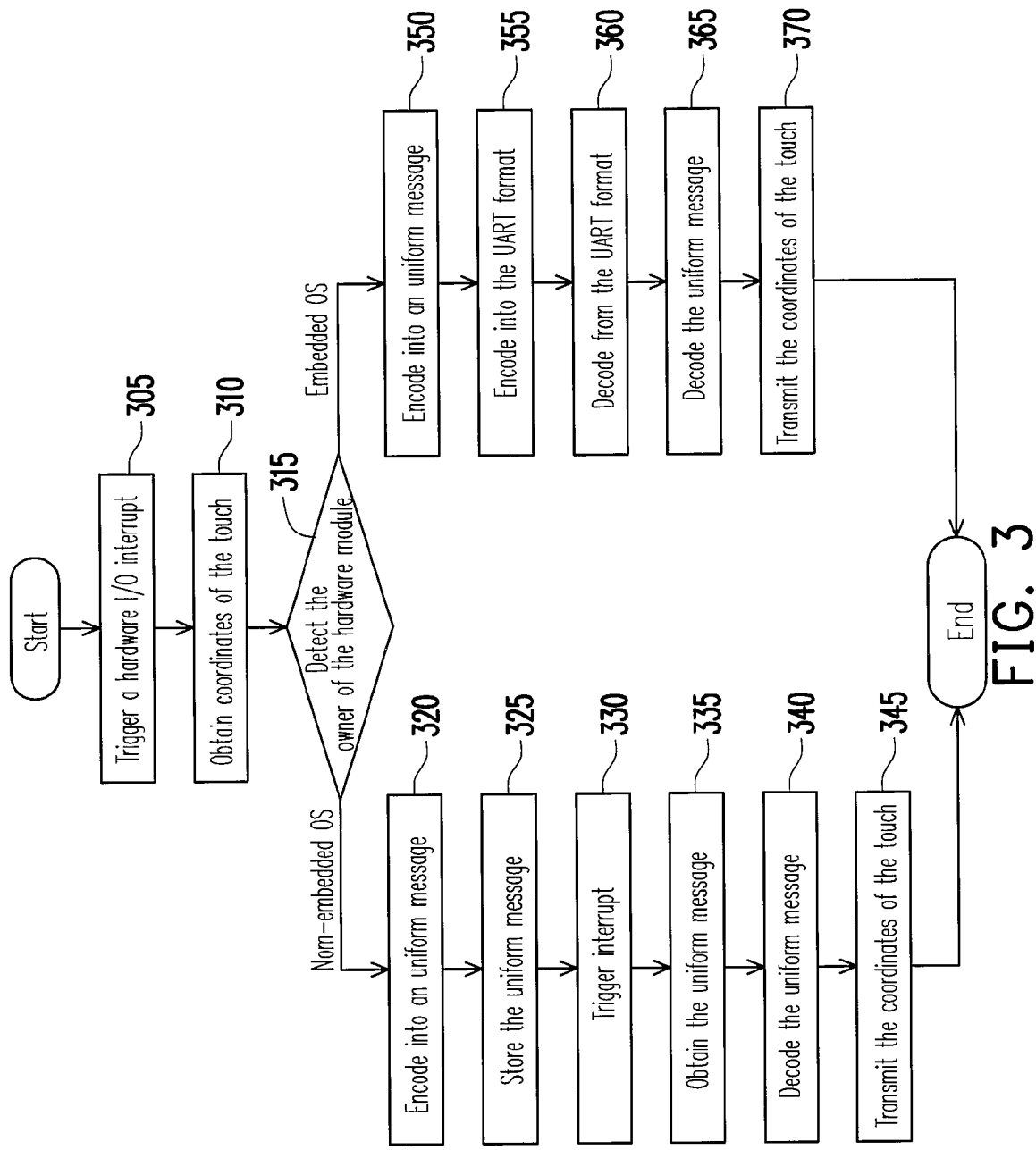
FIG. 3 to FIG. 7 are flow charts of a method for sharing a hardware device according to embodiments of the present invention.

The following embodiments are used for illustrating the details of sharing hardware device two operating systems executed on a mobile device. FIG. 3 is a flow chart of a method for sharing a hardware device according to an embodiment of the present invention. Referring to FIG. 1B and FIG. 3, this embodiment is an exemplary communication flow from the common hardware module 150 to the non-embedded OS 110 or the embedded OS 130 when the touch screen 162 is touched by the user. When the touch screen 162 is touched by the user, the touch screen 162 triggers a hardware I/O interrupt to notify the EC 153 (step 305). The EC 153 obtains the coordinates of the touch from the touch screen 162, which includes the X and Y coordinates and the pressure of the touch (step 310). Next, the EC 153 checks which OS is the current owner of the common hardware module 150 (step 315). If the non-embedded OS 110 is the owner, the flow goes to step 320, otherwise the flow goes to step 350.

At step 320, the EC 153 encodes the coordinates of the touch into a uniform message by filling the fields of the uniform message. The command field 203 is filled to indicate that the uniform message is carrying the coordinates of the touch on the touch screen 162. The coordinates of the touch are filled into the Data field 204. Next, the EC 153 stores the uniform message in its internal memory (step 325) and then triggers an interrupt to notify the EC driver 123 (step 330). Afterwards, the EC driver 123 obtains the uniform message from the EC 153 through the LPC device 151 (step 335). Next, the EC driver 123 decodes the uniform message and finds out that the data field 204 carries the coordinates of the touch by inspecting the command field 203 (step 340). Consequently the EC driver 123 forwards the coordinates to the touch screen driver 111 (step 345).

On the other hand, if the embedded OS 130 is the owner, the EC 153 encodes the coordinates of the touch into another uniform message by filling the fields of the uniform message (step 350). The contents of this uniform message may be different from those at step 320 because a different interface is involved here. Next, the EC 153 encodes the uniform message into the UART format (step 355). Afterwards, the UART driver 142 obtains the uniform message through the UART device 152 and then decodes the uniform message from the UART format (step 360). The IPC driver 141 obtains the uniform message from the UART driver 142, decodes the uniform message (step 365), and then forwards the coordinates data to the touch screen driver 131 (step 370).

Figure 4:
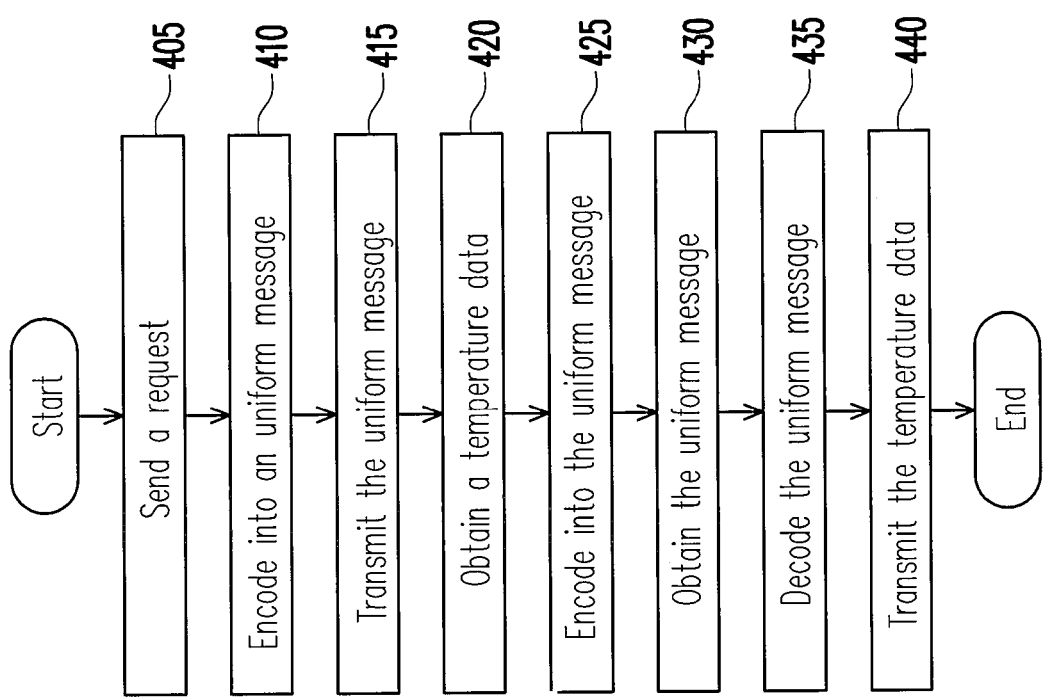

FIG. 4 is a flow chart of a method for sharing a hardware device according to an embodiment of the present invention. Referring to FIG. 1B and FIG. 4, this embodiment is an exemplary communication flow which happens when the control panel module 121 requests the system temperature from the hardware monitor 161.

Firstly, the control panel module 121 sends the request for temperature data to the EC driver 123 through the user service module 122 (step 405). The EC driver 123 encodes the request into a uniform message (step 410) and sends the uniform message to the EC 153 through the LPC device 151 (step 415). The EC 153 inspects the command field 203 and obtains the system temperature from the hardware monitor 161 (step 420). Next, the EC 153 encodes the temperature data into another uniform message (step 425). Afterwards, the EC driver 123 obtains the uniform message from the EC 153 through the LPC device 151 (step 430). The EC driver 123 inspects the command field 203 and finds out that the uniform message contains the temperature data. Next, the EC driver 123 decodes the temperature data from the uniform message (step 435) and forwards the temperature data to the control panel module 121 through the user service module 122 (step 440).

Figure 5:
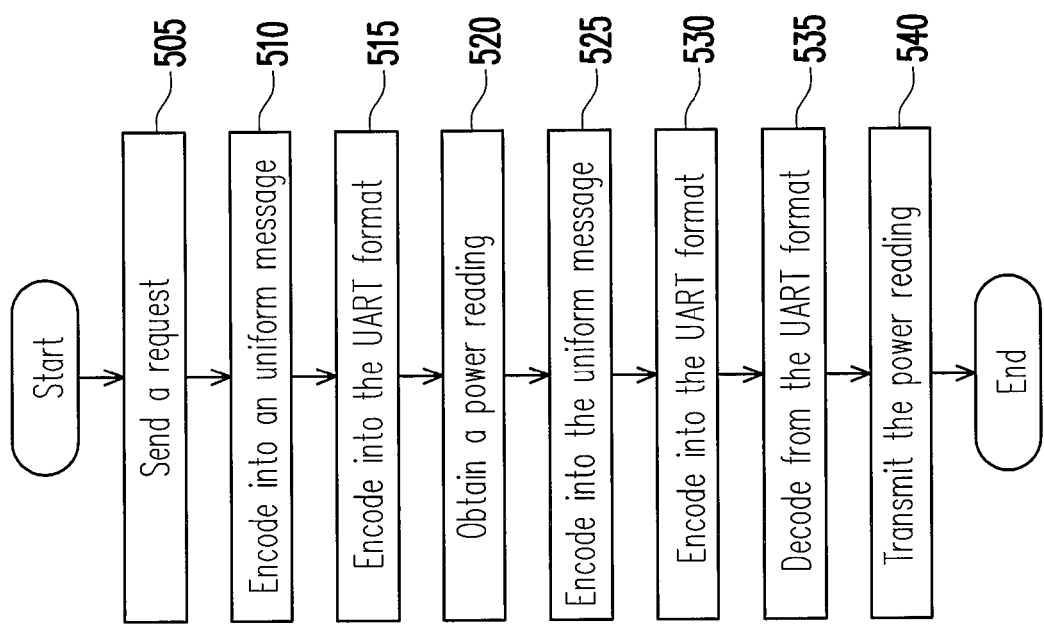

FIG. 5 is a flow chart of a method for sharing a hardware device according to an embodiment of the present invention. Referring to FIG. 1B and FIG. 5, this embodiment is an exemplary communication flow which happens when the battery driver 135 requests for the level of remaining battery power.

Firstly, the battery driver 135 sends the request to the IPC driver 141 (step 505). The IPC driver 141 encodes the request into a uniform message (step 510) and sends the uniform message to the UART driver 142. Next, the UART driver 142 encodes the uniform message into the UART format (step 515). The EC 153 obtains the uniform message from the UART driver 142 through the UART device 152, inspects the command field 203 to find out the type of the request, and then obtains the power reading of the battery 164 according to the command field 203 (step 520). Afterwards, the EC 153 encodes the power reading into another uniform message (step 525) and then encodes the uniform message by the UART device 153-22 (shown in FIG. 1A) into the UART format (step 530). The UART driver 142 obtains the uniform message from the EC 153 through the UART device 152 and decodes the uniform message from the UART format (step 535) so that the IPC driver 141 can read the uniform message. Next, the IPC driver 141 obtains the uniform message from the UART driver 142, inspects the command field 203 and sends the power reading to the battery driver 135 according to the command field 203 (step 540).

More flows similar to those in FIG. 4 and FIG. 5 may be followed by the two operating systems 110 and 130 to query other information from the common hardware module 150, such as the temperature of the battery 164 or the rotating speed of the smart fan 168.

Figure 6:
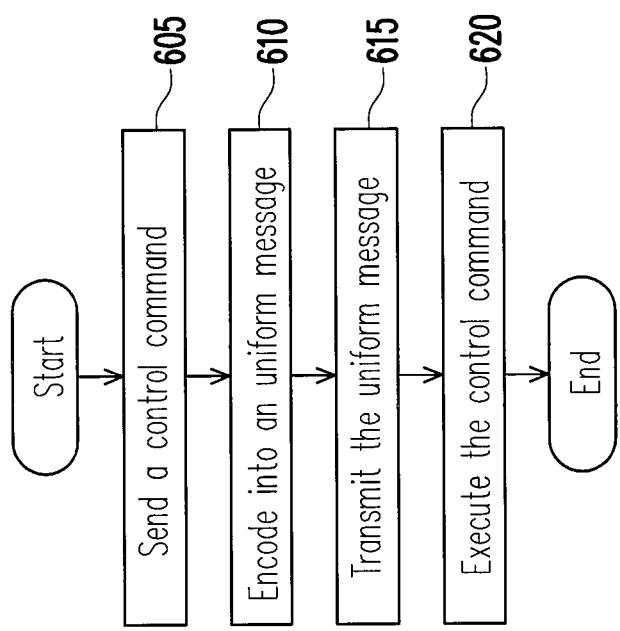

FIG. 6 is a flow chart of a method for sharing a hardware device according to an embodiment of the present invention. Referring to FIG. 1B and FIG. 6, this embodiment is an exemplary communication flow which happens when a user of the mobile device controls the rotating speed of the smart fan 168 on the UI of the control panel module 121.

The control panel module 121 sends the control command to the EC driver 123 (step 605). The EC driver 123 encodes the control command into a uniform message (step 610) and sends the uniform message to the EC 153 (step 615). The EC 153 inspects the command field 203, decodes the desired rotating speed from the uniform message and sets the rotating speed of the smart fan 168 accordingly (step 620). Flows similar to the flow in FIG. 6 may be followed by the two operating systems 110 and 130 to control other peripheral devices in the common hardware module 150. For example, the non-embedded OS 110 may turn on or turn off the web camera 167 through the EC 153 in such a flow.

Figure 7:
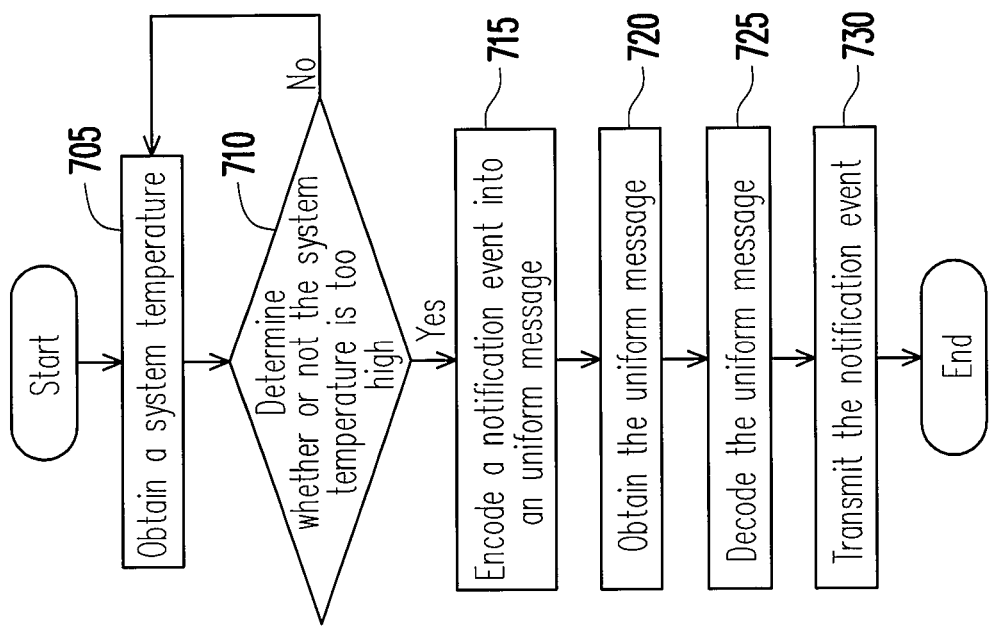

FIG. 7 is a flow chart of a method for sharing a hardware device according to an embodiment of the present invention. Referring to FIG. 1B and FIG. 7, this embodiment is an exemplary communication flow in which the EC 153 moni-tors the system temperature. The EC 153 obtains the system temperature from the hardware monitor 161 (step 705) and compares the system temperature with a predetermined threshold in order to determine whether the system temperature is too high (step 710). If the system temperature is not too high, the flow returns to step 705. If the system temperature is too high, the EC 153 encodes a notification event into a uniform message (step 715). The EC driver 123 obtains the uniform message from the EC 153 (step 720), inspects the command field 203, and then decodes the notification event from the uniform message according to the command field 203 (step 725). Finally, the EC driver 123 transmits the notification event to the control panel module 121 through the user service module 122 (step 730). When the control panel module 121 receives the notification event, it may show a warning message on the LCD panel 18 to inform a user that the system temperature is too high. Alternatively, when the control panel module 121 receives the notification event, it may transmit a control command to speed up the rotating speed of the smart fan 168 through the method described in FIG. 6 so as to reduce the system temperature.

As discussed above, the uniform message and the three-party communication architecture shown in FIG. 1B not only unify the various native interfaces of the drivers, modules, and peripheral devices, but also enable the sharing of the peripheral devices in the common hardware module 150 between the two operating systems 110 and 130. The architecture in FIG. 1B is only exemplary. In other embodiments of the present invention, the architecture of the mobile device may support more software drivers in the dual operating systems and more peripheral devices in the common hardware module 150.

In embodiments described above, the hardware device shared by the operating systems 110 and 130 is electrically connected to the EC 153. However, in other embodiment of the present invention, the purpose of sharing hardware device by operating systems 110 and 130 can also be achieved even through the hardware device is not connected to the EC 153.

In one embodiment, as shown in FIGS. 1A and 1B, the embedded OS 130 connects to a wireless communication network through the communication standard (e.g. GPRS, EDGE, CDMA2000, WCDMA, and HSDPA) supported by the network connection module 20, and run applications like web browser for surfing the Internet or E-mail application for receiving E-mail through the wireless communication network. The non-embedded OS 110 of the mobile device has no network connection hardware.

When the non-embedded OS 110 needs to access the network, the non-embedded OS 110 may transmit a network sharing request to the embedded OS 130 through an UART interface 153-2 supported by the EC 153. Next, the embedded OS 130 becomes an emulator of a universal serial bus (USB) network interface card (NIC) after receiving the network sharing request. In this embodiment, the connection port of the emulated USB NIC is the USB port 22 provided by the embedded processor 12, and connect to the USB interface supported by the non-embedded OS 110 (that is, the USB port 19 provided by the integrated controller 16-2), so that the non-embedded OS 110 may share the network access capability of the embedded OS 130. As a result, the non-embedded OS 110 may connect to the wireless communication network and run network applications such as web browser, file transfer protocol (FTP) client, or E-mail application.

According to the embodiment of the present invention, the non-embedded OS 110 may communicate with the embedded OS 130 through the UART interface or the USB interface. When the data transmitted between the two operating systems 110 and 130 is large in size, the USB interface may be used for transmitting the data. In addition, when the data transmitted between the two operating systems 110 and 130 is small in size, the UART interface is used for transmitting the data.

In view of the above, an embedded controller of the mobile device described above is connected to peripheral hardware devices, so as to achieve the purpose of sharing peripheral hardware devices among different operating systems. Consequently, only one set of peripheral hardware devices is needed in the mobile device and can be shared among multiple operating systems, not only the hardware cost of manufacturing the mobile device can be reduced, but also the purpose of increasing portability and saving power can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile device, comprising:
   a first processor for executing a first operating system (OS);
   a second processor for executing a second OS and connecting to a wireless communication network through a network connection module;
   a hardware device for generating an input data;
   a control unit, electrically connecting to the first processor and the second processor; and
   an embedded controller, coupled to the control unit, the second processor and the hardware device, for communicating between the first OS and the hardware device and between the second OS and the hardware device through a uniform message,
   wherein the first OS is operative to transmit a network sharing request to the second OS through the embedded controller, and the second OS is operative to become an emulator of a network interface card after receiving the network sharing request,
   wherein when the first OS encodes a first operating command into the uniform message and sends the uniform message to the embedded controller, the embedded controller decodes the uniform message to the first operating command such that the hardware device operates according to the first operating command;
   wherein when the second OS encodes a second operating command into the uniform message and sends the uniform message to the embedded controller, the embedded controller decodes the uniform message to the second operating command such that the hardware device operates according to the second operating command; and
   wherein when the embedded controller receives the input data from the hardware device, the embedded controller encodes the input data into the uniform message and sends the uniform message to one of the first OS and the second OS, and the OS receiving the uniform message decodes the uniform message to the input data.

2. The mobile device as claimed in claim 1, wherein the embedded controller is configured to generate a switch signal, and the mobile device further comprises:
   a control unit, coupled between the first processor and the embedded controller, for outputting a first display signal relative to a first user interface of the first OS, wherein the second processor is configured to output a second display signal relative to a second user interface of the second OS;
   a first display switching controller, electrically coupled to the control unit and the embedded controller, for receiving the first display signal and the switch signal and determining whether or not to output the first display signal according to the switch signal;
   a second display switching controller, electrically coupled to the second processor and the embedded controller, for receiving the second display signal and the switch signal, and determining whether or not to output the second display signal according to the switch signal; and
   a display panel, electrically coupled to the first display switching controller and the second display switching controller, for receiving one of the first display signal and the second display signal,
   wherein the display panel displays the first user interface of the first OS when receiving the first display signal and displays the second user interface of the second OS when receiving the second display signal.

3. The mobile device as claimed in claim 2, wherein the embedded controller further comprises:
   a register for storing one of a first value and a second value;
   a switch unit, electrically coupled to the embedded controller, for receiving an input from a user so as to switch the stored value between the first value and the second value,
   wherein the embedded controller outputs the switch signal according to the stored value in the register,
   wherein when the stored value in the register is changed, an ownership of the embedded controller and the hardware device is switched between the first OS and the second OS, wherein the embedded controller sends the uniform message to the OS having the ownership.

4. The mobile device as claimed in claim 1, wherein the first OS comprises an embedded controller driver for encoding the first operating command into the uniform message and sending the uniform message to the embedded controller; the second OS comprises an inter-process communication (IPC) driver for encoding the second operating command into the uniform message and sending the uniform message to the embedded controller; and the embedded controller driver and the IPC driver are configured to decode the uniform message sent by the embedded controller to the input data.

5. The mobile device as claimed in claim 4, wherein the first OS further comprises a first hardware device driver, and the embedded controller driver is configured to send the input data to the first hardware device driver; and the second OS further comprises a second hardware device driver, and the IPC driver is configured to send the input data to the second hardware device driver.

6. The mobile device as claimed in claim 1, wherein the embedded controller further comprises:
   a first communication port for receiving the uniform message encoded by the first OS; and
   a second communication port for receiving the uniform message encoded by the second OS.

7. The mobile device as claimed in claim 1, wherein the uniform message includes:
   a length field, recording a byte length of the uniform message;
   a identification field, recording a source and s destination of the uniform message;
   a command field, recording an instruction format; and
   a checksum field, containing a checksum of the uniform message.

8. The mobile device as claimed in claim 1, wherein the embedded controller communicates with the first OS through a first interface of the control unit and communicates with the second OS through a second interface of the second processor, wherein the first interface is different from the second interface.

9. A mobile device, comprising:
a first processor for executing a first OS;
a second processor for executing a second OS and connecting to a wireless communication network through a network connection module;
a hardware device for generating an input data;
a control unit, electrically connecting to the first processor and the second processor; and
an embedded controller, coupled to the control unit and the second processor, having a first communication port, a second communication port, and a connection port, wherein the connection port electrically coupled to the hardware device for receiving the input data, and the embedded controller selectively sends the received input data to the first OS via the first communication port or to the second OS via the second communication port,
wherein the first OS is operative to transmit a network sharing request to the second OS through the embedded controller, and the second OS is operative to become an emulator of a network interface card after receiving the network sharing request.

10. The mobile device as claimed in claim 9, wherein when the embedded controller receives the input data from the connection port, the embedded controller encodes the received input data into a uniform message and then selectively sends the uniform message to the first OS via the first communication port or to the second OS via the second communication port; and
wherein when the first OS or the second OS receives the uniform message, it decodes the uniform message to the input data.

11. The mobile device as claimed in claim 9, wherein the first OS comprises a first driver for decoding the uniform message to the input data, and the second OS comprises a second driver for decoding the uniform message to the input data.

12. The mobile device as claimed in claim 9, further comprising:
a first display controller for outputting a first display signal, wherein the first display signal is relative to a first user interface of the first OS;
a second display controller for outputting a second display signal, wherein the second display signal is relative to a second user interface of the second OS;
a switch unit for receiving an input from a user, wherein the embedded controller generates a switch signal according to the input from the user;
a first display switching controller, electrically coupled to the first display controller and the embedded controller, for receiving the first display signal and the switch signal and determining whether or not to output the first display signal according to the switch signal;
a second display switching controller, electrically coupled to the second display controller and the embedded controller, for receiving the second display signal and the switch signal and determining whether or not to output the second display signal according to the switch signal; and
a display panel, electrically coupled to the first display switching controller and the second display switching controller, for receiving one of the first display signal and the second display signal,
wherein the display panel displays the first user interface of the first OS when receiving the first display signal and displays the second user interface of the second OS when receiving the second display signal.

13. A mobile device, comprising:
a first processor for executing a first OS, wherein the first OS is configured to provide a first operating command;
a second processor for executing a second OS and connecting to a wireless communication network through a network connection module, wherein the second OS is configured to provide a second operating command;
a hardware device;
a control unit, electrically connecting to the first processor and the second processor; and
an embedded controller, coupled to the control unit and the second processor, the embedded controller comprising a first communication port for receiving the first operating command from the first OS, a second communication port for receiving the second operating command from the second OS, and a connection port electrically coupled to the hardware device, wherein the embedded controller is configured to selectively receive the first operating command via the first communication port or receive the second operating command via the second communication port, and output the received operating command to the hardware device via the connection port such that the hardware device operates according to the outputted operating command,
wherein the first OS is operative to transmit a network sharing request to the second OS through the embedded controller, and the second OS is operative to become an emulator of a network interface card after receiving the network sharing request.

14. The mobile device as claimed in claim 13, wherein the first OS is further configured to encode the first operating command into a first uniform message, the second OS is further configured to encode the second operating command into a second uniform message, and the embedded controller is further configured to selectively receive the first uniform message via the first communication port or receive the second uniform message via the second communication port,
wherein when the embedded controller receives the first uniform message via the first communication port, the embedded controller decodes the first uniform message to the first operating command and then outputs the first operating command to the hardware device via the connection port such that the hardware device operates according to the first operating command; and when the embedded controller receives the second uniform message via the second communication port, the embedded controller decodes the second uniform message to the second operating command and then outputs the second operating command to the hardware device via the connection port such that the hardware device operates according to the second operating command.

15. A mobile device, comprising:
a first processor for executing a first OS;
a second processor for executing a second OS and connecting to a wireless communication network through a network connection module;
a control unit, electrically connecting to the first processor and the second processor;
an embedded controller electrically coupled to the control unit and the second processor, the embedded controller providing a first communication interface for transmitting a first data between the first OS and the second OS; and a second communication interface constructed between the first OS and the second OS for transmitting a second data.

16. The mobile device as claimed in claim 15, wherein the size of the second data is greater than the size of the first data.

17. The mobile device as claimed in claim 15, wherein the first communication port and the second communication port are serial communication ports.

18. The mobile device as claimed in claim 17, wherein the first communication interface is an UART interface, and the second communication interface is a USB interface.

19. A method for sharing a hardware device in a mobile device, the mobile device having a hardware device and configured to execute a first OS and a second OS, the method comprising:
   receiving an input data from the hardware device;
   encoding the input data into a uniform message;
   transmitting the uniform message to one of the first OS and the second OS;
   decoding the uniform message to the input data when the uniform message is received by one of the first OS and the second OS; and
   receiving a network sharing request from the first OS and transmitting the network sharing request to the second OS, wherein the second OS is operative to become an emulator of a network interface card after receiving the network sharing request.

20. The method as claimed in claim 19, wherein the step of decoding the uniform message to the input data further comprises:
   decoding the uniform message to the input data through a driver, and transmitting the input data to a software module.

21. The method as claimed in claim 19, further comprising:
   detecting whether or not a switch unit of the mobile device is triggered;
   switching a value stored in a register between a first value and a second value and switching an ownership of the hardware device between the first OS and the second OS when the switch unit is triggered; and
   switching to execute the first OS or the second OS according to the stored value,
   wherein the step of transmitting the uniform message to one of the first OS and the second OS comprises:
   transmitting the uniform message to the OS having the ownership.

22. A method for sharing a hardware device in a mobile device, the mobile device having a hardware device and an embedded controller and configured to execute a first OS and a second OS, the method comprising:
   encoding an operating command into a uniform message by one of the first OS and the second OS, and transmitting the uniform message to the embedded controller;
   decoding the uniform message to the operating command by the embedded controller, and transmitting the operating command to the hardware device such that the hardware device operates according to the operating command; and
   receiving a network sharing request from the first OS and transmitting the network sharing request to the second OS, wherein the second OS is operative to become an emulator of a network interface card after receiving the network sharing request.

23. A mobile device, comprising:
   a first processor for executing a first OS;
   a second processor for executing a second OS and connecting to a wireless communication network through a network connection module;
   a hardware device for generating an input data;
   a control unit, electrically connecting to the first processor and the second processor; and
   an embedded controller, coupled to the control unit, the second processor and the hardware device, for communicating between the first OS and the hardware device and between the second OS and the hardware device,
   wherein the first OS is operative to transmit a network sharing request to the second OS through the embedded controller, and the second OS is operative to become an emulator of a network interface card after receiving the network sharing request.

24. The mobile device as claimed in claim 23, wherein the embedded controller is configured to generate a switch signal, and the control unit is configured to output a first display signal relative to a first user interface of the first OS, the mobile device further comprises:
   a first display switching controller, electrically coupled to the control unit and the embedded controller, for receiving the first display signal and the switch signal and determining whether or not to output the first display signal according to the switch signal; and
   a display panel, electrically coupled to the first display switching controller, for receiving the first display signal, wherein the display panel displays the first user interface of the first OS when receiving the first display signal.

25. The mobile device as claimed in claim 24, wherein the second processor is configured to output a second display signal relative to a second user interface of the second OS, the mobile device further comprises:
   a second display switching controller, electrically coupled to the second processor and the embedded controller, for receiving the second display signal and the switch signal, and determining whether or not to output the second display signal according to the switch signal; and
   wherein the display panel is electrically coupled to the first display switching controller and the second display switching controller, for receiving one of the first display signal and the second display signal,
   wherein the display panel displays the second user interface of the second OS when receiving the second display signal.

26. The mobile device as claimed in claim 23, wherein the second OS is operative to become the emulator of a universal serial bus (USB) network interface card after receiving the network sharing request.

27. The mobile device as claimed in claim 26, wherein a USB interface of the first OS is connected to an USB connection port of the second processor to access the wireless communication network.

28. The mobile device as claimed in claim 23, wherein the first OS is operative to connect to the wireless communication network through the second OS and to run at least one of a web browser application, a file transfer protocol (FTP) client application, and an E-mail application

* * * * *